United States Patent [19]

Herbulot

[11] 4,450,940

[45] May 29, 1984

[54] BRAKE WITH HEAT SHIELD

[75] Inventor: Jean Herbulot, Franconville, France

[73] Assignee: Valeo, Paris, France

[21] Appl. No.: 253,380

[22] Filed: Apr. 13, 1981

[30] Foreign Application Priority Data

Apr. 18, 1980 [FR] France .............................. 80 08699

[51] Int. Cl.³ ..................... F16D 55/36; F16D 65/847
[52] U.S. Cl. ................................... 188/71.3; 188/71.5;
 188/71.6; 188/72.5; 188/264 A; 188/264 G
[58] Field of Search ....... 188/264 A, 264 AA, 264 G,
 188/264 R, 264 W, 218 A, 218 R, 218 XL, 71.6,
 72.4, 72.5, 71.5, 71.3, 71.4, 73.46, 73.47, 73.39,
 18, 370, 364, 367; 192/113 A, 113 B; 301/6 CS,
 6 CF, 6 WB

[56] References Cited

U.S. PATENT DOCUMENTS

| | | | |
|---|---|---|---|
| 2,298,333 | 10/1942 | Ash et al. | 188/264 G |
| 2,466,990 | 4/1949 | Johnson et al. | 188/264 G |
| 2,517,972 | 8/1950 | Cardwell et al. | 188/264 G |
| 3,051,528 | 8/1962 | Rogers | 188/264 G |
| 3,061,050 | 10/1962 | Van Horn | 188/264 G |
| 4,005,768 | 2/1977 | Bubnash et al. | 188/264 AA X |
| 4,064,974 | 12/1977 | Filderman | 188/71.5 X |
| 4,326,610 | 4/1982 | Mouza | 188/71.6 X |

FOREIGN PATENT DOCUMENTS

| | | |
|---|---|---|
| 2134940 | 1/1973 | Fed. Rep. of Germany . |
| 1388322 | 12/1964 | France . |
| 1031946 | 6/1966 | United Kingdom .......... 188/264 G |
| 1350350 | 4/1974 | United Kingdom . |
| 1424976 | 2/1976 | United Kingdom . |
| 2029532 | 3/1980 | United Kingdom . |

Primary Examiner—Douglas C. Butler
Attorney, Agent, or Firm—Charles E. Brown

[57] ABSTRACT

The invention relates to a brake of the kind having a rotary member to be braked, at least one brake shoe, a control member for applying the brake shoe to the rotary member, and a heat shield for minimizing the transmission of heat to the control member. According to the invention, the heat shield is carried by the control member and comprises a heat reflector interposed between the control member and the rotary member.

This arrangement significantly reduces heat transmission to the control member during operation. The invention is especially suitable for motor vehicle brakes in which the rotary member comprises parallel twin discs.

4 Claims, 6 Drawing Figures

BRAKE WITH HEAT SHIELD

BACKGROUND OF THE INVENTION

The present invention relates generally to brakes of the kind having a rotary member to be braked, at least one brake shoe, and a control member for enabling the brake shoe to be applied to the rotary member. More particularly, but not exclusively, the invention relates to brakes of this kind which are intended for motor vehicles.

In such brakes, the rotary member to be braked may for example, comprise a single disc or two spaced coaxial discs arranged parallel to one another; it can alternatively comprise a ring or a drum.

In the case where the rotary member to be braked is formed by a single disc, (and this also applies in the case where the rotary member comprises a ring), the control member generally incorporates at least one control block for applying a brake shoe to one of the faces of the disc; in practice the control member possesses either two control blocks each arranged respectively on either side of the disc, for application of a brake shoe to each of the faces of the disc, in which case the control member is generally fixed, or, alternatively, one control block for application of a brake shoe to a first face of the disc, and a transfer part for application, by reaction, of a brake shoe to the second face of the said disc, in which case the control block is either fixed or movable with the transfer part.

In the case where the rotary member to be braked comprises two discs, the control member generally comprises at least one control block arranged between the discs, this control block being common to the discs; alternatively several control blocks may be individually associated with one or both of the discs.

Finally, in the case where the rotary member is a drum, the control member is generally arranged within this drum, between the ends of the two brake shoes.

In all cases, one of the problems to be solved in the construction of brakes of this kind is that of limiting the temperature increase to which the control member is subjected in service due to the generation of heat between the rotary member and each of the brake shoes during braking.

In the case (as is usual in practice) where the control member is a hydraulic unit, the requirement to limit the operating temperature is imperative in order to prevent the hydraulic fluid in the unit from being subjected to the so-called "vapour-lock" phenomenon, whereby local vaporisation of the hydraulicfluid may cause the assembly to seize.

For this purpose, French Pat. No. 1,388,322 proposed the use of a sheet-metal heat shield interposed between the piston of the hydraulic control unit and the brake shoe on which this piston acts.

With this arrangement, this heat shield is in direct contact with the brake shoe and is displaceable with the assembly consisting of the brake shoe and the piston acting thereon.

The effectiveness of a heat shield of this kind is limited for two reasons: firstly the shield only influences that part of the heating of the hydraulic control unit which is directly induced by the brake shoe on which the piston of the unit bears, and secondly the shield interferes only by conduction with the propagation of this heat, by forming a break in the heat path.

In practice, in the patent in question, the heat shield consists of a part which primarily serves another purpose, namely that of preventing undesired rotation of the piston with which it is engaged, and is only utilised in a secondary capacity for limiting heat propagation.

The present invention provides a heat shield of greater effectiveness.

SUMMARY

More precisely, the present invention provides a brake of the kind comprising a rotary member to be braked, at least one brake shoe, a control member adapted to apply the brake shoe to the rotary member, and a heat shield adapted to minimise heat propagation to the control member during operation, the brake being characterised in that the heat shield is mounted on the control member and is interposed between the control member and the rotary member and forms a heat reflector.

Thus, the function of the heat shield according to the invention is not limited to preventing the propagation of the heat originating only from the brake shoe, but, in a more general and hence more effective manner, reduces the propagation of the heat originating from the rotary member to be braked.

Moreover, in the case where the control member comprises a hydraulic unit, its area of influence is not limited only to that of the piston which this hydraulic unit possesses, but extends to that of the whole of the control member, the heating of the hydraulic fluid in the said hydraulic unit being due both to the heating of the piston and to the heating of the remainder of the control member.

Furthermore, because it forms a reflector, the heat shield according to the invention effectively restricts propagation of heat by radiation rather than by conduction; and because it establishes a separation between the air surrounding the rotary member and the air surrounding the control member, it also effectively opposes propagation of heat by convection.

In this respect, according to a preferred embodiment, the heat shield is kept out of contact with the control member by means of spacers so that air can circulate between the heat shield and the control member.

The protection of the control member from heat transmission is thereby improved.

Finally, albeit to a lesser extent, by virtue of its shape and size, the heat shield forms a radiator, assisting the dissipation of the heat into the ambient air.

In practice, and as confirmed by tests, the heat shield according to the invention achieves a substantial lowering of the temperature of the control member, all other conditions being equal.

If the control member comprises a hydraulic control unit, the temperature reduction achieved with the aid of a heat shield according to the invention, for the liquid in this hydraulic unit, is of the order of 10% in brakes in which the rotary member comprises a single disc, and of the order of 20% in brakes of this kind in which the rotary member comprises two discs, for the control blocks located between these discs.

DESCRIPTION OF THE PREFERRED EMBODIMENTS

Figure 1:
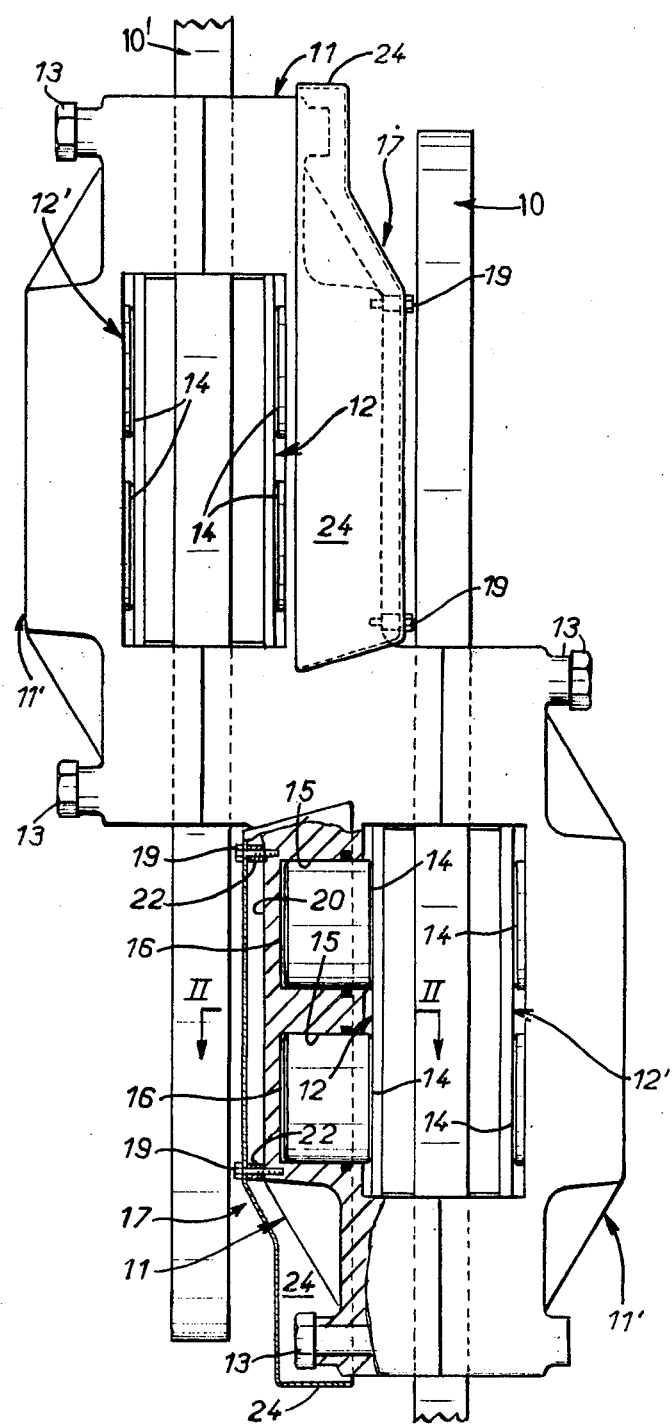
FIG. 1 is a plan view, partially cut away, of a brake according to a first embodiment of the invention.
Figure 2:
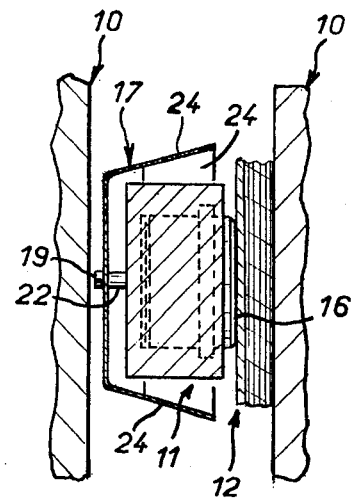
FIG. 2 is a partial cross-sectional view of the brake of FIG. 1, along the line II—II of FIG. 1.

FIGS. 1 and 2 illustrate one embodiment of a brake according to the invention, in which the rotary member which is to be braked comprises two coaxial discs 10, 10' arranged parallel to, and separated from, one another.

The brake also has a control member comprising at least one control block 11 arranged axially between the discs 10, 10' for application of a brake shoe 12 to disc 10.

In the embodiment shown, two control blocks 11 are provided between the discs 10, 10', these control blocks being spaced circumferentially. One of the control blocks 11 is operable to apply a brake shoe 12 against the disc 10, whilst the other is operable to apply a brake shoe 12 against the disc 10'.

Of course, the two control blocks 11 can be separate or, as shown, can form part of one and the same mechanical assembly.

Moreover, in the embodiment shown, there is, associated with each control block 11, a further control block 11', which is arranged on the other side of the respective disc 10, 10' and is operable to apply a brake shoe 12' to the corresponding face of the latter.

The control blocks 11, 11' are joined to one another by screws 13 which extend beyond the periphery of the disc 10', and the blocks 11, 11' together thus form a control member which, in practice, is fixed.

For acting on a brake shoe 12, 12', each respective control block 11, 11' is provided, in the embodiment shown, with two pistons 14 which are disposed parallel to one another and are each respectively mounted to slide in cylinders 15, the pistons 14 defining, with these cylinders 15, hydraulic chambers 16 which can be connected to a pressurised fluid supply (not shown).

These arrangements are in themselves well known and, since they do not form part of the present invention, they will not be described in greater detail in this text.

As will be noted, for the control blocks 11 located between the discs 10, 10', the hydraulic control chambers 16 are disposed relatively closely to that disc which is not acted on by the respective control block 11, and this is because there is only a small space available between the discs 10, 10' in which to locate the control blocks 11.

A heat shield 17 is associated with each control block 11 and is provided so as to minimise propagation to that control block 11 of heat originating from the opposite disc 10 or 10', that is to say from the disc 10 or 10' which is acted on by the control block 11.

According to the invention, the heat shield 17 is carried by the control block 11 with which it is associated, and, being interposed between the latter and the opposite disc 10 or 10', forms a reflector.

In practice, the heat shield 17 according to the invention is joined by fixing means, such as screws 19, to that face 20 of the respective control block 11, which is opposite the disc 10 or 10', i.e. the shield is secured to that face of the control block 11 which forms the bottom wall of the hydraulic control chambers 16 belonging to the control block 11.

Preferably, and as shown, the heat shield 17 is held away from the control block 11 by means of spacers 22, which comprise, for example, sleeves engaged on the corresponding screws 19.

Thus, air can circulate between this protective screen 17 and the control block 11 with which it is associated.

Preferably, each heat shield 17 possesses a flange on at least one of its sides.

In the embodiment shown, each heat shield 17 used has the general shape of a trough and, by means of flanges 24, encloses the respective control block 11 on at least two opposite sides of the latter and, in practice, in the embodiment shown, on three sides of this control block 11, the flanges 24 being directed substantially towards the disc 10 or 10' to which this control block 11 is adapted to apply a brake shoe 12.

Figure 3:
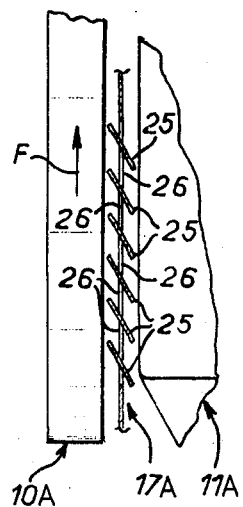
FIG. 3 is a partial plan view of a second embodiment of brake according to the invention.

According to a second embodiment illustrated schematically in FIG. 3, there is provided, facing the opposite disc 10A, a heat sheild 10A at least part of which is perforated like a shutter and comprises slats 25, extending approximately radially relative to this disc, whilst being obliquely inclined to the latter, and openings 26 between the slats 25.

In practice, and as shown, the inclination of the slats 25 of this heat shield 17A, relative to the respective disc 10A, is in the same direction as the direction of rotation of the disc, marked by an arrow F in FIG. 3, so that, during the rotation of the disc 10A, the air surrounding the control block 11 between the latter and the heat shield 17A is drawn through the openings 26 in the heat shield 17A by the air surrounding the disc 10A between the latter and the heat shield 11A, this air itself being entrained by the disc A. The protection of the control block 11 from heat is therby improved.

Figure 4:
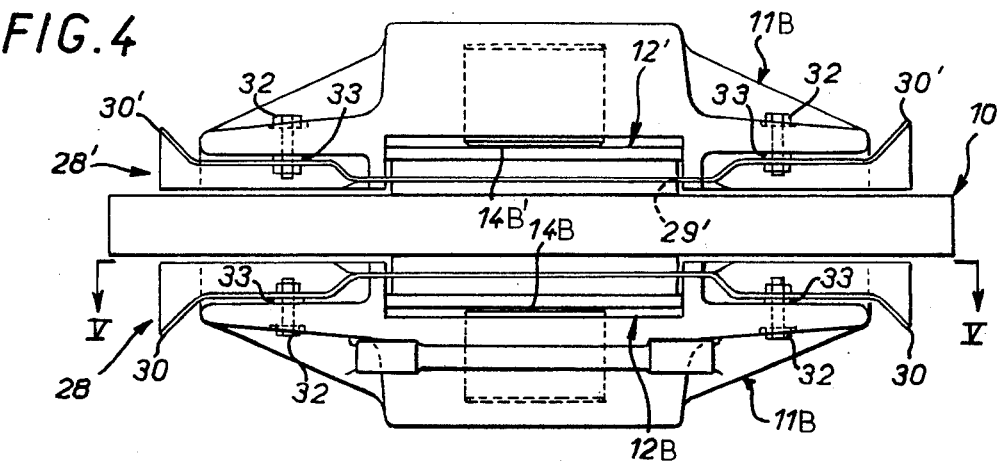
FIG. 4 is an elevation, from underneath, of a third embodiment of brake according to the invention, viewed in the direction of the arrow IV in FIG. 5.
Figure 5:
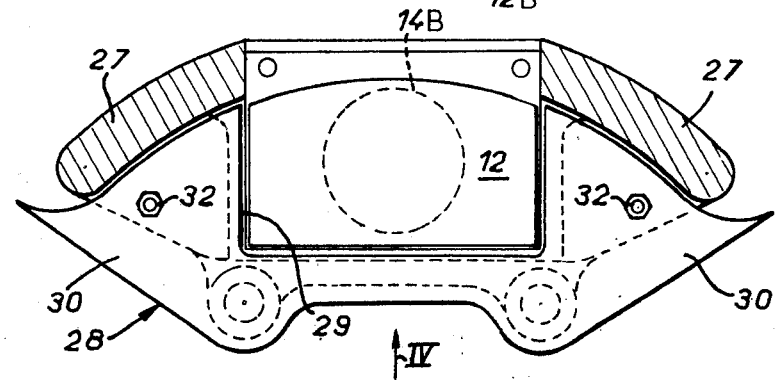
FIG. 5 is a cross-sectional view of the brake of FIG. 4 along the line V—V of FIG. 4.

FIGS. 4 and 5 illustrate the application of the invention to a brake in which the rotary member comprises a single rotary disc 10B with which two control blocks 11B, 11'B are associated, which are operable to apply brake shoes 12B, 12'B to the single disc, on the two opposite faces of the latter. According to arrangements analogous to those briefly described above, each control block 11B, 11'B possesses a piston 14B, 14'B for this purpose.

In practice, in the embodiment shown in FIGS. 4 and 5, the control blocks 11B, 11'B together form a fixed control member, the said control blocks 11B, 11'B being joined to one another, into a unitary element, by means of spacers 27 which extend parallel to the axis of the disc 10B, beyond the periphery of the latter, on either side of the brake shoes 12B, 12'B.

A heat shield 28, 28' is associated with each control block 11B, 11'B respectively and is carried by the respective control block 11B, 11'B. Each shield 28 is interposed between the control block 11B, 11'B and the disc 10B and thus forms a reflector. Each heat shield extends substantially transversely, parallel to the disc 10B, passing round the corresponding brake shoe 12B, 12'B by means of an aperture 29, 29'.

In the embodiment shown, laterally, each heat shield 28, 28' extends a very considerable distance beyond the corresponding control block 11B, 11'B by means of flanges 30, 30' which progressively diverge from the corresponding face of the disc 10B. Each heat shield 28, 28' is joined to the corresponding control block 11B, 11'B with the aid of any suitable fixing means, for example screws 32, whilst being kept separated from the latter by means of spacers 33 which consist, in the embodiment shown, of washers engaged on the fixing means.

Figure 6:
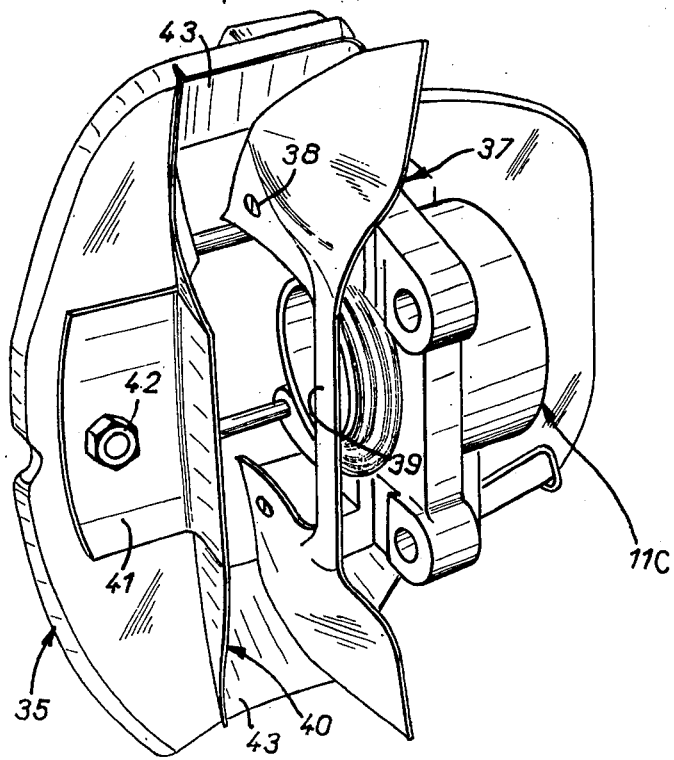
FIG. 6 is a view in perspective, from underneath, of a fourth embodiment of brake according to the invention and of which some of the constituent elements have been removed for clarity.

FIG. 6 also illustrates the application of the invention to a brake in which the rotary member to be braked consists of a single disc, but, in FIG. 6, neither the disc nor the brake shoes are shown in order to improve the clarity of the FIG.

In the embodiment illustrated in FIG. 6, the control member of the brake comprises, on the one hand, a control block 11C for application of a first brake shoe to a first face of the disc in question, and, on the other hand, a transfer part 35 for application, by reaction, of a second brake shoe to the opposite face of the disc. The control block 11C can be fixed; it can also be carried by the transfer part 35.

In the embodiment shown, the transfer part has the general shape of a ring which extends substantially along a chord of the disc in question, passing round the latter. Brakes of this kind are well known and, since they do not form part of the scope of the present invention, they will not be described in greater detail in this text.

According to the embodiment shown in FIG 6, a heat shield 37 is associated with the control block 11C and is joined thereto by means of screws 38, according to methods similar to those described above, and is formed with an aperture 39 for passing round the corresponding brake shoe.

Moreover, on that side of the disc which is opposite to that on which the control block 11C is located, the transfer piece 35 also carries, again in a similar manner to those arrangements described above, a heat shield 40 disposed parallel to the disc. In the embodiment shown, this heat shield 40 is joined by a lug 41 to the transfer piece 35, with the aid of a screw 42, and, laterally, it is provided with extensions 43 which, passing round the disc, approximately rejoin the heat shield 37 associated with the control block 11C.

In all cases, the heat shield according to the invention can be made, for example, of sheet metal; it can also be made of a material chosen for possessing good heat-insulation properties, such as, for example, the material marketed under the name "FEROBESTOS".

In the case where it is made of sheet metal, the heat shield according to the invention can also be provided on one surface with a coating which is a poor heat conductor, for example paint or an oxide layer.

The present invention is not limited to the embodiments which have been described and shown, but includes any modified construction and/or modified combination of the various elements within the scope of the appended claims.

Moreover, the field of application of the invention is not limited only to that of brakes in which the rotary member comprises one or two discs, but equally well extends to that of brakes in which the rotary member to be braked has a different form such as for example, a ring or drum.

I claim:

1. A brake comprising a rotary brake member to be braked, at least one brake shoe cooperable with said rotary member, a control member including a piston and cylinder control block for applying said brake shoe against said rotary member, and a stationary heat shield defining means for shielding said control block from heat radiated by said rotary member, said heat shield being carried by said control member and being disposed in direct facing spaced relation between a lateral face of said rotary member and said control block, said rotary member including a pair of axially spaced brake discs arranged parallel to each other, said control block being disposed between said brake discs for applying said brake shoe against a first of said brake discs, and said heat shield being mounted on said control block and disposed in direct facing spaced relation between the second of said brake discs and said control block, said heat shield having a flange extending axially away from said second brake disc and laterally at least partially around said control block.

2. A brake according to claim 1 together with spacer means for mounting said heat shield out of direct contact with said control block so that air may circulate between said heat shield and said control block.

3. A brake according to claim 1, wherein said flange extends entirely laterally around said control block.

4. A brake according to claim 1, further including another control block disposed between said brake discs for applying another brake shoe against said second brake disc, another heat shield being mounted on said another control block and disposed in direct facing spaced relation between said first brake disc and said another control block, said heat shield having a flange extending axially away from said second brake disc and laterally at least partially around said another control block.

* * * * *